(12) United States Patent
Wilson

(10) Patent No.: US 10,149,454 B2
(45) Date of Patent: Dec. 11, 2018

(54) CAT BED

(71) Applicant: Michael Wilson, Grand Rapids, MI (US)

(72) Inventor: Michael Wilson, Grand Rapids, MI (US)

(*) Notice: Subject to any disclaimer, the term of this patent is extended or adjusted under 35 U.S.C. 154(b) by 192 days.

(21) Appl. No.: 15/143,819

(22) Filed: May 2, 2016

(65) Prior Publication Data

US 2017/0020104 A1    Jan. 26, 2017

Related U.S. Application Data

(60) Provisional application No. 62/155,899, filed on May 1, 2015.

(51) Int. Cl.
*A01K 1/035* (2006.01)

(52) U.S. Cl.
CPC .................. *A01K 1/0353* (2013.01)

(58) Field of Classification Search
CPC .... A01K 1/0353; A01K 1/0157; A01K 1/033; A01K 1/035; A01K 15/024; A01K 15/027; F16B 5/0692; F16B 5/07; F16B 2/10; F16B 2/20; F16B 2/02; F16B 7/04; A44B 13/0088; B60J 7/104; B60J 7/102; B60J 7/10; B60J 7/12; B60J 7/185; A45F 3/22; A45F 3/24; A45F 3/26; A45F 4/08; A47C 17/84

USPC .......... 119/28.5; 5/120, 122, 127, 121, 129, 5/128, 112, 98.3
See application file for complete search history.

(56) References Cited

U.S. PATENT DOCUMENTS

| | | | | |
|---|---|---|---|---|
| 3,857,365 A | * | 12/1974 | Mueller | A01K 1/0353 119/28.5 |
| 5,002,012 A | * | 3/1991 | Pierrot | A01K 15/025 119/28.5 |
| 5,809,933 A | * | 9/1998 | Conwell, III | A01K 15/02 119/28.5 |
| 2008/0127897 A1 | * | 6/2008 | Flannery | A01K 1/0353 119/28.5 |
| 2009/0241852 A1 | * | 10/2009 | Stevens | A01K 15/02 119/706 |

OTHER PUBLICATIONS

Various cat beds can be found at www.petco.com.

* cited by examiner

*Primary Examiner* — Peter M Poon
*Assistant Examiner* — Jeffrey R Larsen
(74) *Attorney, Agent, or Firm* — Caldwell Intellectual Property

(57) ABSTRACT

A cat bed having a bed portion secured between to brackets. The bed portion having grommets to fit over pegs of a bracket bottom, and a bracket top rests upon the bracket bottom to secure the bed portion between the brackets.

13 Claims, 2 Drawing Sheets

CAT BED

PRIORITY CLAIM

This application claims priority from provisional patent application No. 62/155,899 filed on 1 May 2015 titled CAT BED AND SUPPORT.

FIELD OF THE INVENTION

The invention relates to an apparatus that can be adjustably mounted to a wall with a material or fabric disposed between the mounting means. Cats or other pets may rest on the material or fabric.

BACKGROUND OF THE INVENTION

Currently cat beds are usually placed on the floor, or are semi-puffy enclosures similar to dog beds.

There exists a need for a cat bed or support that can be easily and decoratively mounted to a wall at varied heights and locations, and a cat to lay upon a material between two mounting members.

There exists a need for a cat bed that has two mounting means separated by a fabric on which a cat can rest.

There exists a need for a cat bed having two pegs per bracket, that holds material between the bracket by the top of the bracket being positioned on the bottom to press against the material to hold the material in place.

There exists a need for a cat bed having material having grommets in different locations so that the brackets can be positioned at different distances from each other using the same piece of material.

Multiple embodiments of the system are disclosed herein. It will be understood that other objects and purposes of the invention, and variations thereof, will be apparent upon reading the following specification and inspecting the accompanying drawings.

SUMMARY OF THE INVENTION

One aspect of the present invention is a cat bed and support system, comprising: a bed portion having a grommet; a wall support bottom having a peg extending upwardly therefrom; a wall support top having a recess to receive said peg; and whereby said grommet is removably disposed over said peg.

These and other features, aspects and advantages of the present invention will become better understood with reference to the following drawings, description and claims.

DETAILED DESCRIPTION

Figure 1:
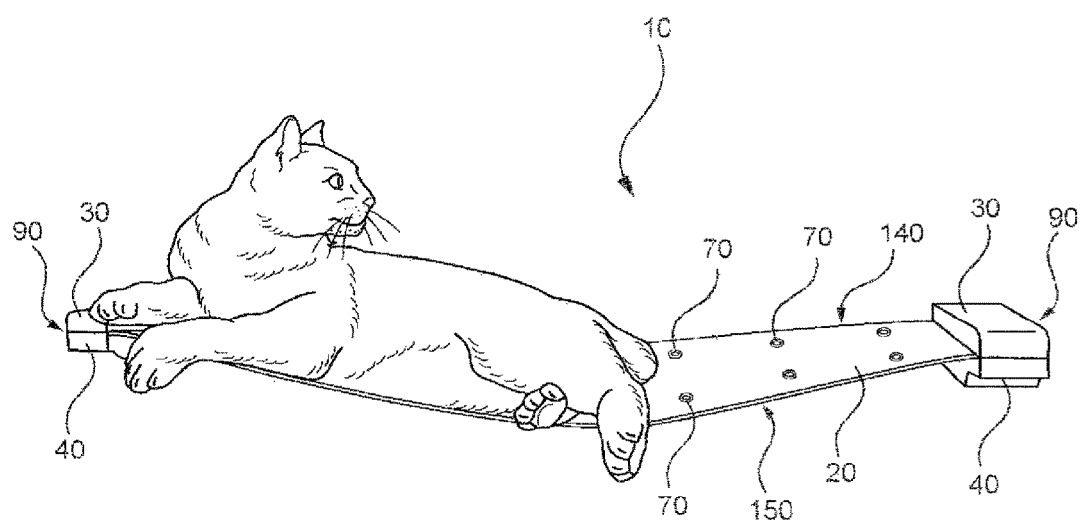
FIG. 1 is a pictorial view of one embodiment of the present invention.

Reference Numerals 10 cat bed and support
20 bed portion
30 bracket top
40 bracket bottom
50 peg
60 aperture
70 bed portion grommet
90 bracket
100 L-shaped support
110 mounting slot
120 vertical arm
130 horizontal arm
140 bed portion rear
150 bed portion front
160 bracket bottom rear wall
170 bracket bottom front wall
180 top bracket cut out
190 bracket bottom face
200 front lip
210 rear lip Certain terminology will be used in the following description for convenience and reference only, and will not be limiting. For example, the words "upwardly," "downwardly," "rightwardly," and "leftwardly" will refer to directions in the drawings to which reference is made. The words "inwardly" and "outwardly" will refer to directions toward and away from, respectively, the geometric center of the system and designated parts. Said terminology will include the words specifically mentioned, derivatives, and similar words.

FIG. 1 illustrates an embodiment of the cat bed 10 of the present invention 10. The cat bed 10 may be comprised of at least two brackets 90 and a bed portion 20 between the brackets 90. The bed portion 20 may be made from cloth. In one embodiment the bed portion 10 is canvas. The brackets 90 may be made from solid wood. The bracket 90 may have a bracket top 30 and a bracket bottom 40. The bottom bracket 40 may have a mounting slot 110. The bed portion 20 may have grommets 70 therein. In one embodiment the grommets 70 pairs of grommets 70 one may be near the bed portion rear 140 and the other near the bed portion front 150. There may be one or more pairs of grommets 70.

Figure 2:
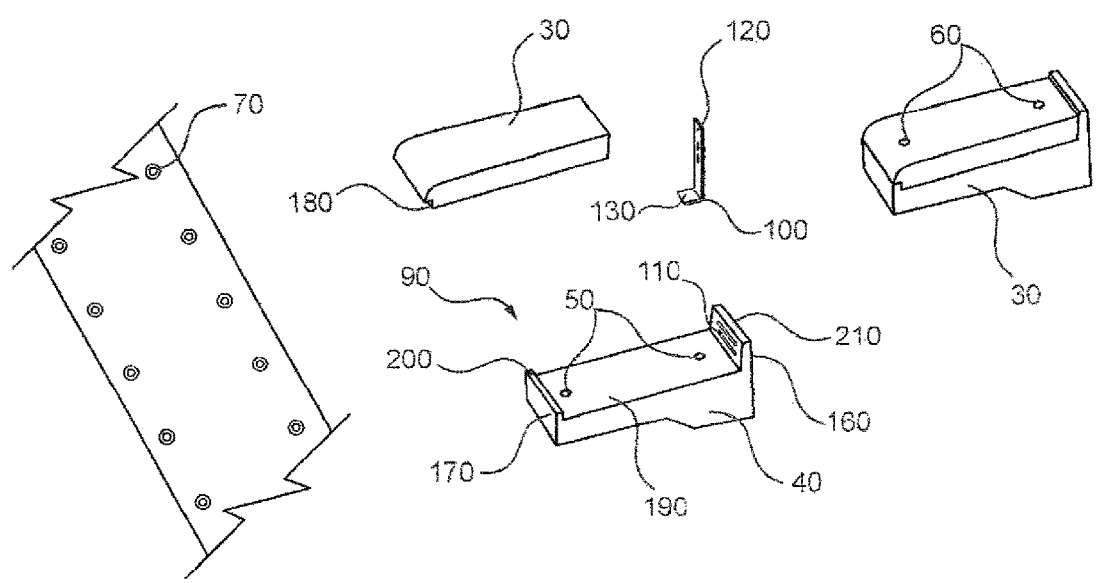
FIG. 2 is a pictorial view of an embodiment of the present invention.

A seen in FIG. 2, an L-shaped support 100 may have a substantially vertical arm 120 and a horizontal arm 130. The horizontal arm 130 may be disposed through the mounting slot 110 of the bottom bracket 40. The vertical arm 120 of the L-shaped support 100 may be screwed to the wall with common screws or screws and anchors.

FIG. 2 also illustrates the bottom bracket 40 having two pegs 50 that extend upwardly to go through the grommets 70 to hold the bed portion 20 in place on the bottom bracket 40. A top bracket 30 may have two apertures 60 to fit over the pegs 50. When the grommets 70 are over the pegs 50 and with the bracket top 30 resting on the bracket bottom 40 the bed portion 20 is securely in place.

In one embodiment the pairs of grommets 70 are spaced 4 inches apart to allow for the brackets 90 to be mounted to studs at either 16 inches or 24 inches apart.

FIG. 2 illustrates an embodiment of a bracket bottom 40 having a peg 50 extending upwardly therefrom to be received by an aperture 60 in the bracket top 30. The wall bracket top 30 may rest on the bracket bottom 40.

In another embodiment the wall support top 30 may snap into the wall support bottom 40, similar to that of a toy's battery case cover.

FIG. 2 also illustrates the bracket bottom rear wall 160 that extends upwardly higher than the bracket bottom face 190. Opposite the bottom bracket rear wall 160 is the bottom bracket front wall 170 that also may extend higher than the bracket bottom face 190. The bracket bottom front wall 170 may extend upwardly from the bracket bottom face 190, then forwardly, then downwardly to define a front lip 200.

The bottom bracket front wall 170 may be substantially perpendicular with respect to the bracket bottom face 190. The bottom bracket rear wall 160 may be substantially perpendicular with respect to the bracket bottom face 190.

The bracket top 30 may have a cut-out that mates with the front lip 200 and fits between the front lip 200 and the rear wall 160.

Similarly, the bottom bracket rear wall 160 may extend upwardly from the bracket bottom face 190, then rearwardly, then downwardly to define a rear lip 210.

Figure 3:
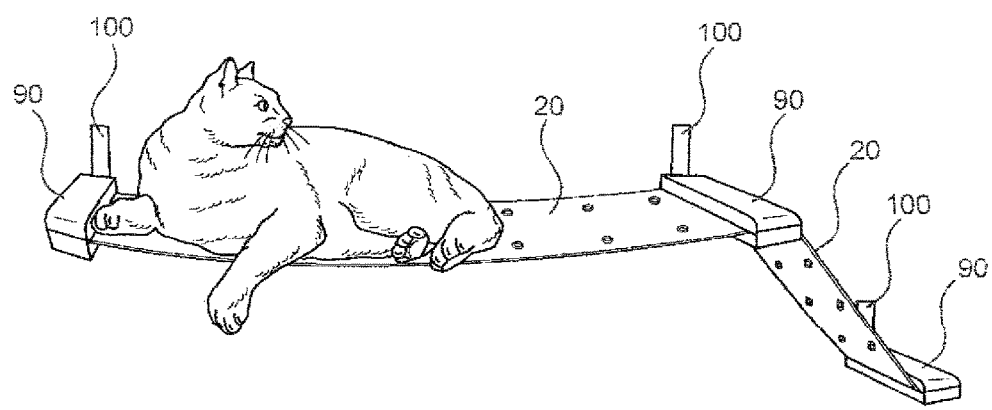
FIG. 3 is a pictorial view of another embodiment of the present invention.

FIG. 3 illustrates another embodiment, whereby there are three brackets 90 and two bed portions 20. Similarly, there can be several brackets 90 and bed portions 20.

Although particular preferred embodiments of the invention have been discussed in detail for illustrative purposes, it will be recognized that variations or modifications of the disclosed apparatus, including the rearrangement of parts, lie within the scope of the present invention.

I claim:

1. A cat bed, comprising:
   a bed portion, the bed portion comprising an elongated sheet of flexible material, the bed portion having a bed portion rear edge, a bed portion front edge, and four or more pairs of grommets, each pair of grommets comprising a first grommet disposed near to the bed portion front edge and a second grommet disposed near to the bed portion rear edge;
   a first bracket including:
      a first bracket bottom comprising first proximal end affixed to a wall, a first upper surface substantially orthogonal to the wall, and a first pair of pegs extending upwardly from the first upper surface; and
      a first bracket top having a first pair of recesses, each recess of the first pair of recesses positioned to receive a peg of the first pair of pegs;
   a second bracket including:
      a second bracket bottom comprising second proximal end affixed to the wall, a second upper surface substantially orthogonal to the wall, and a second pair of pegs extending upwardly from the second upper surface; and
      a second bracket top having a second pair of recesses, each recess of the second pair of recesses positioned to receive a peg of the second pair of pegs;
   wherein:
      the first pair of pegs is inserted through a first pair of grommets of the at least four pairs of grommets;
      the first pair of pegs is inserted into the first pair of recesses;
      the second pair of pegs is inserted through a second pair of grommets of the at least four pairs of grommets; and
      the second pair of pegs is inserted into the second pair of recesses.

2. The cat bed of claim 1, wherein the first bracket is connected solely to the wall and to the bed portion.

3. The cat bed of claim 2, wherein the second bracket is connected solely to the wall and to the bed portion.

4. The cat bed of claim 1 further comprising at least an L-shaped support having a vertical portion fastened to the wall and a horizontal arm portion projecting from the wall.

5. The cat bed of claim 4, wherein the first bracket bottom further comprises a mounting slot in the first proximal end, and wherein the first bracket is affixed to the wall by inserting the horizontal arm into the mounting slot.

6. The cat bed of claim 1, wherein the first bracket top snaps onto the first bracket bottom.

7. The cat bed of claim 1, wherein the first bracket bottom further comprises a bottom bracket rear wall that extends upwardly from the first upper surface, the bottom bracket rear wall located at the first proximal end.

8. The cat bed of claim 7, wherein the bracket rear wall extends above the first bracket top when the first pair of pegs is inserted in the first pair of recesses.

9. The cat bed of claim 7, wherein the bracket rear wall is substantially perpendicular to the first upper surface.

10. The cat bed of claim 1, wherein the first bracket bottom further comprises a lip projecting upward from the first upper surface at a proximal end of the first bracket bottom.

11. The cat bed of claim 10, wherein the first bracket top further comprises a cut-out that mates with the lip when the first pair pegs is inserted in the first pair of recesses.

12. The cat bed of claim 1 further comprising a third bracket including:
   a third bracket bottom comprising third proximal end affixed to the wall, a third upper surface substantially orthogonal to the wall, and a third pair of pegs extending upwardly from the third upper surface; and
   a third bracket top having a third pair of recesses, each recess of the third pair of recesses positioned to receive a peg of the third pair of pegs.

13. The cat bed of claim 12, wherein the third pair of pegs is inserted into a third pair of grommets of the at least four pairs of grommets and the third pair of pegs is inserted into third pair of recesses.

* * * * *